United States Patent [19]

Yanagi

[11] Patent Number: 5,195,067
[45] Date of Patent: Mar. 16, 1993

[54] TRACK ACCESS CONTROL SYSTEM FOR A DISK STORAGE SYSTEM

[75] Inventor: Shigenori Yanagi, Kawasaki, Japan

[73] Assignee: Fujitsu Limited, Japan

[21] Appl. No.: 604,780

[22] Filed: Oct. 26, 1990

[30] Foreign Application Priority Data

Nov. 8, 1989 [JP] Japan .................. 1-290713

[51] Int. Cl.⁵ ............................................ G11B 7/085
[52] U.S. Cl. .................... 369/32; 360/78.07; 369/44.28
[58] Field of Search ............... 360/78.04, 78.05, 78.06, 360/78.07, 78.11; 369/32, 44.28, 44.25, 43, 44.34, 44.37

[56] References Cited

U.S. PATENT DOCUMENTS

| | | | |
|---|---|---|---|
| 4,719,610 | 1/1988 | Bates et al. | 369/32 |
| 4,740,939 | 4/1988 | Kimura et al. | 369/32 X |
| 4,754,129 | 6/1988 | Koh | 369/44.37 X |
| 4,779,251 | 10/1988 | Burroughs | 369/32 |
| 4,782,474 | 11/1988 | Arai et al. | 369/44.34 X |
| 4,972,350 | 11/1990 | Sander et al. | 369/32 X |
| 5,033,039 | 7/1991 | Richgels | 369/43 |
| 5,046,058 | 9/1991 | Shimonou | 369/44.28 X |
| 5,050,146 | 9/1991 | Richgels et al. | 369/32 |
| 5,101,386 | 3/1992 | Kojima et al. | 369/32 |

OTHER PUBLICATIONS

Patent Abstracts of Japan, vol. 9, No. 157 (P-369), Jul. 2, 1985, & JP 60-32134.

Primary Examiner—Wayne R. Young
Attorney, Agent, or Firm—Welsh & Katz, Ltd.

[57] ABSTRACT

The track access control system of an optical disk drives moves the beam emitted from an optical head on the target track designated by a read instruction or write instruction issued from a host controller. The track access control system controls the head position and moving speed. With this invention, the head is controlled by generating a target tracking error signal and comparing it with an actual tracking error signal. The difference between the two signals is used to move the head in the desired manner.

14 Claims, 12 Drawing Sheets

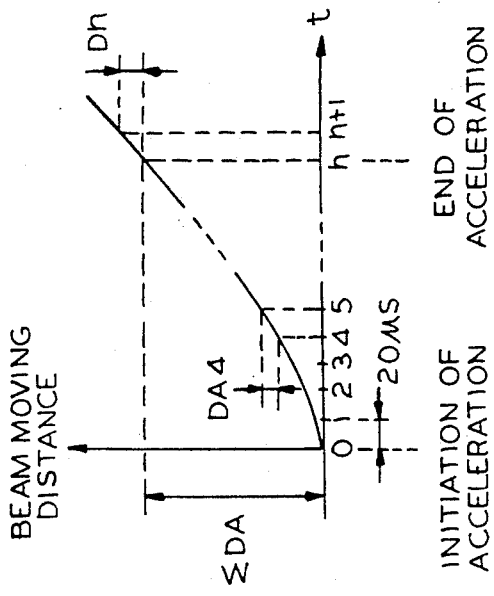
FIG.12a
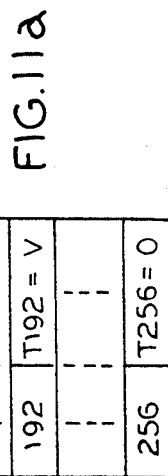
FIG.12b
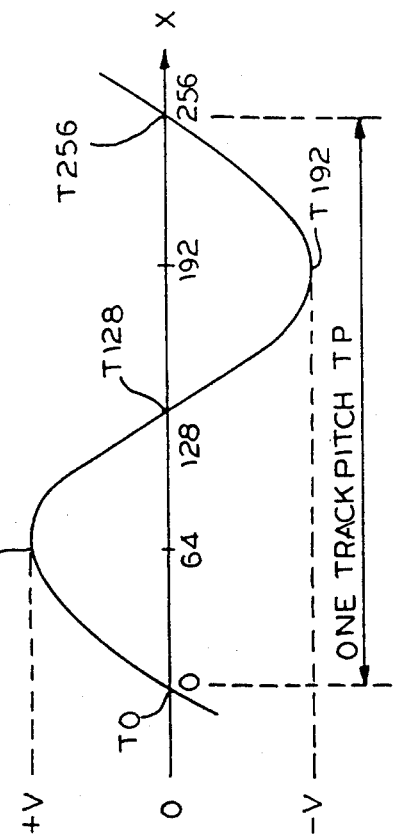
FIG.11a
FIG.11b

TRACK ACCESS CONTROL SYSTEM FOR A DISK STORAGE SYSTEM

BACKGROUND OF THE INVENTION

1. Field of the Invention

The present invention relates to track access control of disk drives for moving a head to a target track depending on an access instruction from a host controller, and more particularly, to track access control methods and apparatus for optical disk drives for moving a beam emitted from an optical head to the target track through servo control of a tracking actuator.

2. Description of the Related Art

An optical disk drive has large storing capacity since the track pitch can be set in the order of several microns. For this and other reasons, there is interest in using such drives as a large capacity storage apparatus of a computer system.

The track access control system of an optical disk drives moves the beam emitted from an optical head to a target track designated by a read instruction or write instruction issued from a host controller. The track access control system controls the beam position and moving speed.

FIG. 1 is a diagram for explaining a conventional apparatus. In FIG. 1, an optical head 12 is provided for freely determining the position of the beam in the radial direction with a head drive motor 26 for an optical disk 10 which may be rotated at a constant speed, for example, of 3600 rpm by a spindle motor 24. A read/write operation of information is carried out to or from the optical disk 10 through irradiation of an optical beam from the optical head 12.

Within the optical head 12, a laser diode 28 is provided as a light source. The light beam from the laser diode 28 is guided to an objective 36 through a collimeter lens 30, a polarization beam splitter 32, and a λ/4 (¼ wavelength) plate 34. The light beam is then narrowed to a beam spot by the objective 36 to irradiate an optical disk 10. The light beam reflected from the optical disk 10 is reflected in the right angle direction by the polarization beam splitter 32 and enters a 4-splitted photodetector 40 through a condenser lens 38.

In such an optical disk apparatus, many tracks are formed with a track pitch of 1.6 μm, for example, in the case of ISO standard, in the radial direction of the optical disk 10. Therefore, only a little eccentricity results in a large deviation of track position. Moreover, waving of the optical disk results in deviation of the focal point of the beam spot. Accordingly, a beam spot of 1 μm or less is required to follow such positional deviation.

For this reason, a focusing actuator 42 for adjusting the focal point by vertically moving the objective 36 of the optical head 12, and a tracking actuator 14 for causing the beam to follow the track by moving the objective 36 in the direction crossing the track, are provided.

The focusing actuator 42 is controlled by a focusing servo circuit 46. Namely, the focusing servo circuit 46 drives the focusing actuator 42 so that a focus error signal FES obtained from the receiving signal of the 4-splitted photodetector 40 is minimized.

The tracking actuator 14 is controlled by the tracking servo circuit 48 during track servo operation for positioning the beam to the target track, and is speed-controlled by a speed control circuit 50 during the track access for moving the beam to the target track for the next new access.

FIG. 2 is a diagram for explaining the conventional track access control. The speed control is carried out for feedback control of the tracking actuator so that speed error Ve between the target speed Vt and beam moving speed V is minimized in order to move the beam to the target track position from the initial track position S. Simultaneously, the track actuator is brought quickly to the target speed through acceleration control by applying an acceleration pulse voltage of +Va for a constant period at the time of initiating track access, while the tracking actuator is decelerated, at the time of completing the track access, by applying a deceleration pulse voltage of −Va for a constant period. Thereby, the tracking actuator reaches the target track while the beam speed is set to zero and initiates the position control (fine control).

The beam moving speed required for track access control can be detected theoretically for each ½ track from the zero cross period of the tracking error signal TES or gradient of signal (differential value) at the time of zero cross. However, in the actual apparatus, it is impossible to detect beam speed in every other ½ track but in every other track in order to eliminate the influence of DC offset of the tracking error signal TES.

However, for detection of the beam moving speed in such conventional track access control, when the beam moving speed is high, the zero cross interval of the tracking error signal TES becomes small, the quantity of information obtained in the unit time increases and stable beam position control can be realized. But, when the beam moving speed becomes low, the quantity of information obtained in each unit of time decreases and phase delay of the beam position control becomes significant. Therefore, accurate beam position control cannot be realized when the beam speed is low, which occurs immediately before completion of access to the target track. When the beam reaches the target track and changes the speed control to the position control (fine control), there is a problem in that the naturally unstable positioning to the target track becomes further unstable, and a longer time is required before the beam is positioned to the target track and read or write operations can be initiated.

SUMMARY OF THE INVENTION

The present invention has been proposed considering the problems of the prior art explained above. It is therefore an object of the present invention to provide a track access control method and an apparatus for disk drives which can accurately move the head to the target track.

It is another object of the present invention to provide a method for controlling access to the target track by a novel method in place of accessing the target track by controlling the beam moving speed in the conventional method just described.

In order to attain such objects, the present invention does not employ the conventional track access control method where the beam moving speed is computed from the tracking error signal which is generated for each track crossover, and the head is moved to the target track by controlling the beam speed. In this invention, the track access control system generates a tracking error signal which is the target of the tracking error signal itself, detects a difference between the target tracking error signal and actual tracking error signal, and controls the beam so that the actual tracking error signal follows the target tracking error signal.

BRIEF DESCRIPTION OF THE DRAWINGS

FIG. 11(a) illustrates and example of Table 1 of FIG. 4;

FIG. 11(b) depicts a standard tracking error signal associated with the address as shown in Table 1 of FIG. 11(a);

FIG. 12(a) illustrates an example of Table 2 of FIG. 4;

FIG. 12(b) depicts a distance/time relationship used during acceleration control based on Table 2;

DETAILED DESCRIPTION

Figure 3:
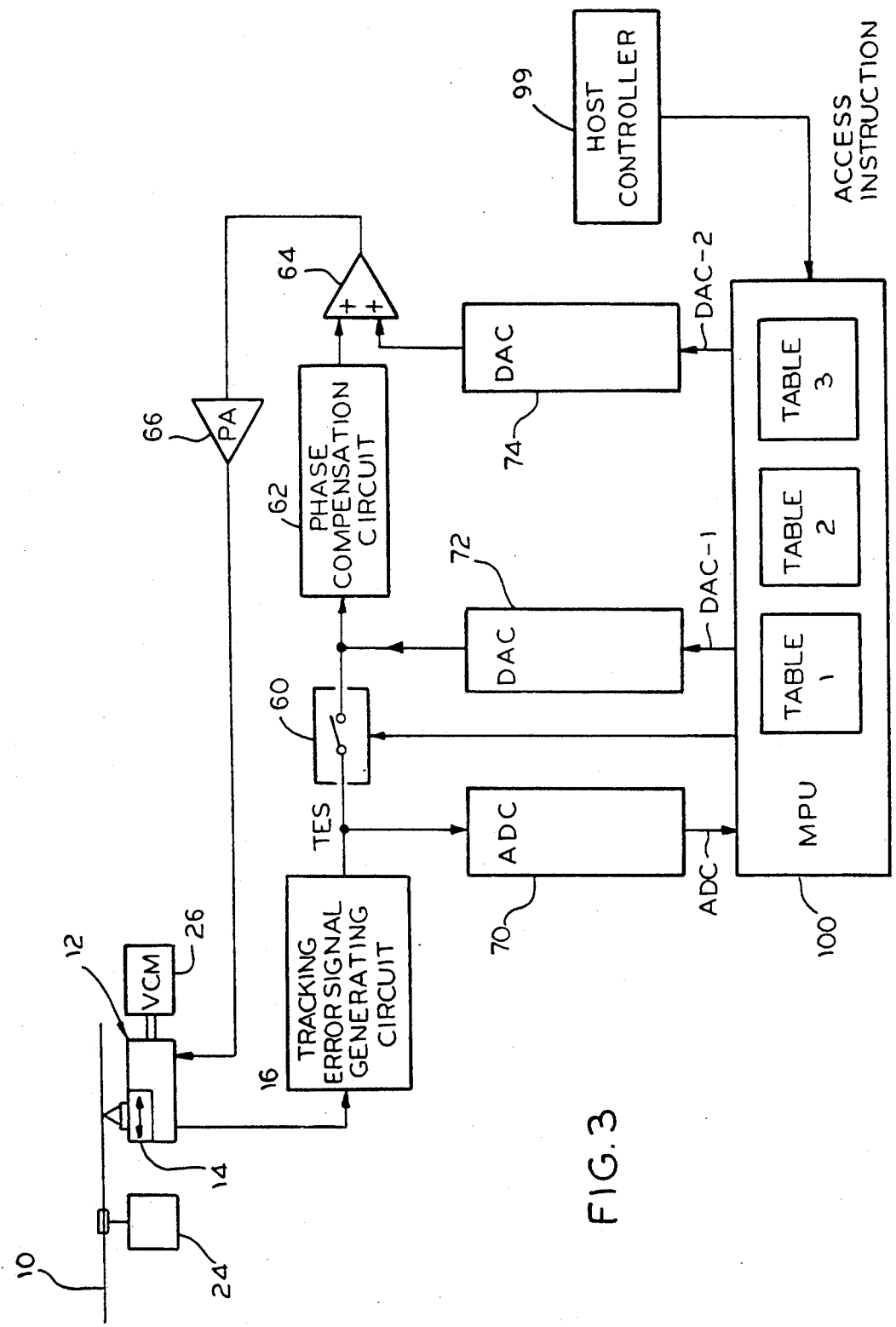
FIG. 3 is a structural diagram of an embodiment of the present invention.
Figure 4:
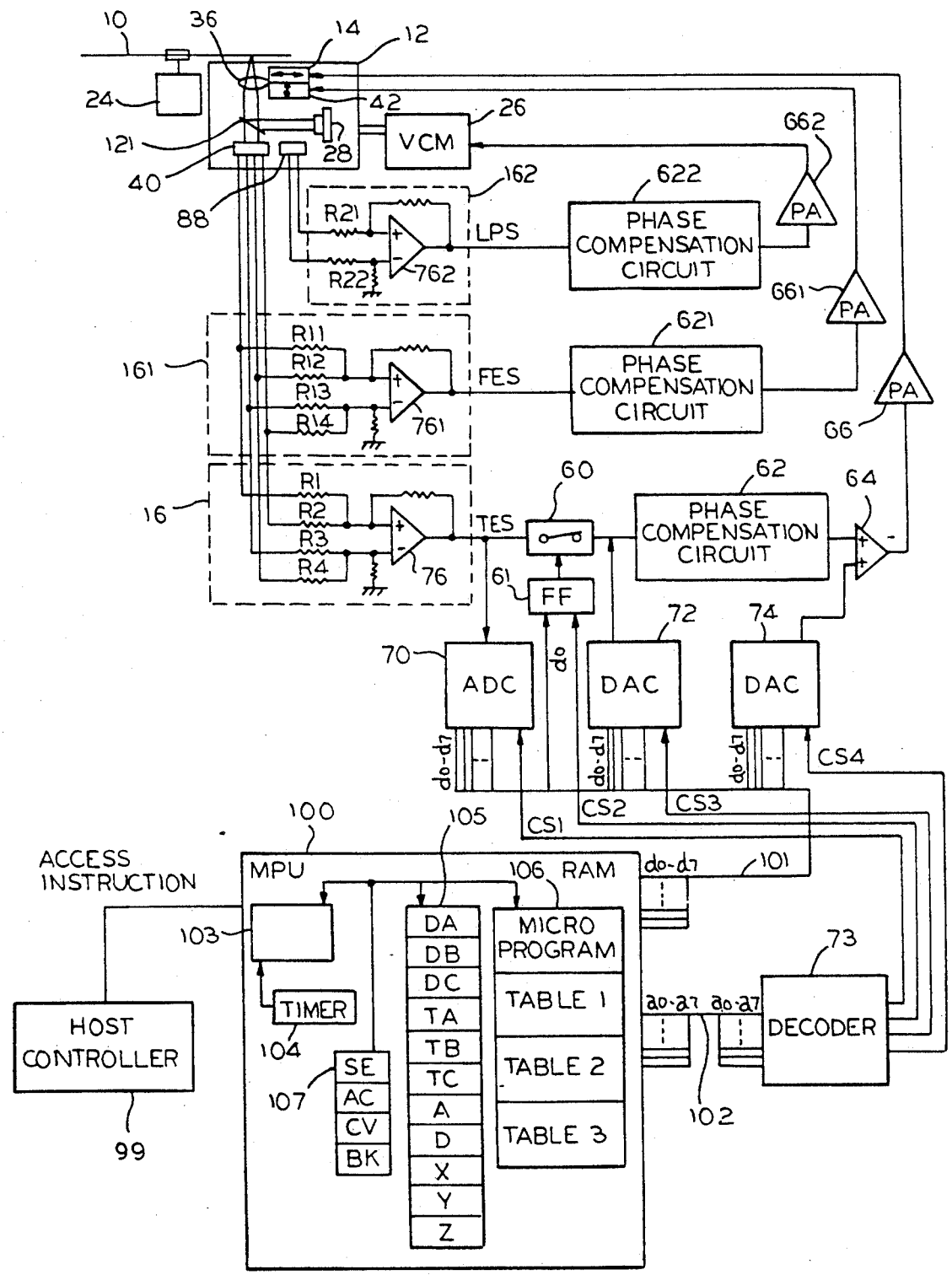
FIG. 4 is a further detail structural diagram of the apparatus of FIG. 3.

FIG. 3 is a structural diagram of optical disk apparatus which includes an embodiment of the present invention. FIG. 4 is a detailed structural diagram of the embodiment shown in FIG. 3.

In FIG. 3, reference numeral 10 denotes an optical disk, which is rotated at a constant speed, for example, at 3600 rpm, by a spindle motor 24. The optical disk 10 includes an erasable photo magnetic disk.

For the optical disk 10, an optical head 12 is provided which is moved in the radial direction by a voice coil motor (VCM) 26. The optical head 12 includes a track actuator 14 which moves the objective 36 for focusing the laser beam as a beam spot on the optical disk 10.

The optical head 12 also includes a 4-splitted photo-detector 40 for receiving the light beam reflected from the optical disk 10. Reference numeral 16 denotes a tracking error signal generating circuit which inputs the signal sent from the 4-splitted photodetector 40 and generates a tracking error signal TES.

An output of the tracking error signal generating circuit 16 is given to a phase compensation circuit 62 through a control switch 60. The phase compensation circuit 62 compensates for lead phase by enhancing the high frequency area of the servo band width. The tracking error signal TES, phase-compensated by the phase compensation circuit 62, is applied to a power amplifier 66 through an adder 64, and is then converted to a current output therein in order to drive a tracking coil of tracking actuator 14 provided in the optical head 12.

A servo circuit comprising the tracking error signal generating circuit 16, phase compensation circuit 62 and power amplifier 66 forms a servo system for operating the track servo (position control or fine control), causing the beam spot from the optical head 12 to follow the tracks.

The access control circuit by which the beam spot accesses the target track will now be explained.

Access control is realized through program control by MPU 100. To MPU 100, the tracking error signal TES is applied through conversion to digital signal by AD converter 70. Moreover, MPU 100 is provided with a DA converter 72 for error setting and a DA converter 74 for setting acceleration or deceleration voltage. MPU 100 stores table information such as Table 1, Table 2 and Table 3 for realizing track access control of the present invention. Using such table information, the target tracking error signal for simulating the target track position is generated, any error between the actual tracking error signal, converted into a digital signal by the AD converter 70, and the target tracking error signal is measured, and such error is output to the DA converter 72.

The error signal, converted to an analog signal by the DA converter 72, is applied across the control switch 60 and phase compensation circuit 62. An acceleration voltage or deceleration voltage, converted to analog signal by DA converter 74, is added, by the adder 64, to the tracking error signal TES, phase-compensated by the phase compensation circuit 62.

Using FIG. 4, the embodiment shown in FIG. 3 will be explained in more detail. The optical head 12, which is driven in the radial direction of disk 10 by a voice coil motor (VCM) 26, includes a laser diode 28, an objective 36 for focusing the beam output from the laser diode 28 on the determined track of the disk 10, an optical system 121 for deflecting the beam output from laser diode 28 to the objective 36 and also deflecting the beam reflected from the disk 10 to a 4-splitted detector 40, a tracking actuator 14 for driving the objective 36 in the radial direction of disk 10, a focusing actuator 42 for driving the objective 36 in the vertical direction to the surface of disk 10, and a 4-splitted photodetector 40 for detecting beam output reflected from the disk 10.

Figures 5, 6:
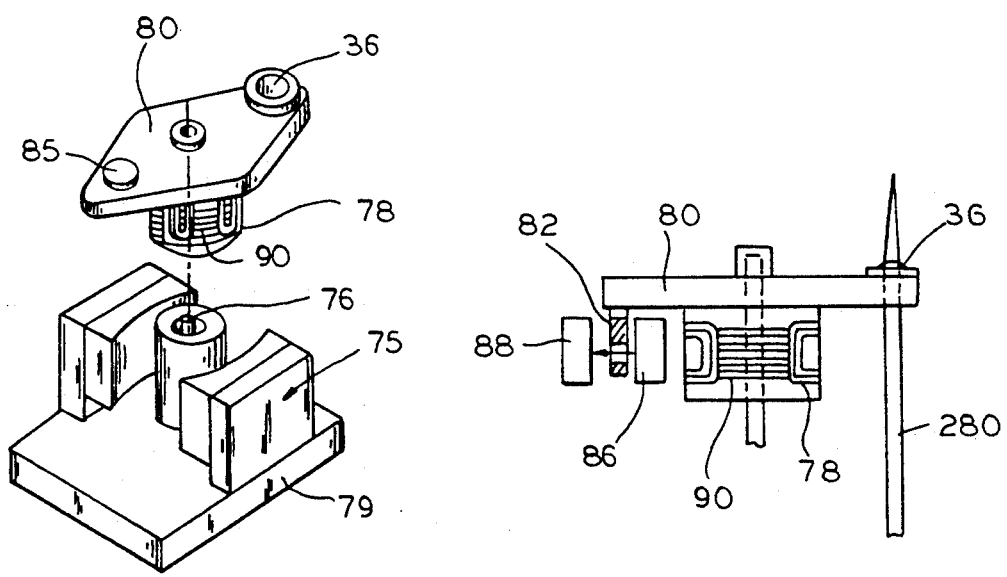
FIG. 5 is a perspective view for explaining the tracking actuator of the apparatus of FIG. 4.
FIG. 6 is a side cutaway view of the tracking actuator of the apparatus of FIG. 4.

The mechanism of the objective 36, tracking actuator 14, and focusing actuator 42 of the optical head 12, is shown in FIG. 5.

In FIG. 5, a magnetic circuit 75 is fixed on a base 79. A slide axis 76 is erected at the center of magnetic circuit 75. A rotary arm 80 is provided as a movable part adjacent to the fixing part in the side of base 79 and a tracking coil 78 and a focusing coil 90 are located at the circumference of the lower cylindrical part of rotary arm 80. At the end portion of rotary arm 80, the objective 36 is mounted and a weight 85 for taking balance is also loaded in the opposite side. The center of rotary arm 80 is engaged with the slide axis 76 in the side of base 79 through the center shaft hole, and the rotary arm 80 rotates around the shaft and also slides in the axial direction.

FIG. 6 shows the rotary arm 80 shown in FIG. 5. The beam spot focused on the disk 10 through the objective 36 from the beam 280 can be moved in the radial direction of disk 10 by swinging the rotary arm 80 in the radial direction of disk 10, around the slide axis 76. The 2-splitted photodetector 88 is used for detecting the amount of rotation of rotary arm 80 with reference to the position of rotary arm 80 when the beam 280 passes the center of objective 36. A slit plate 82 having a slit is secured in the side of the rotary arm 80 which is opposite the objective 36. Light from a light emitting device 86 is applied to the 2-splitted photodetector 88 through the slit plate 82. Therefore, when the rotary arm 80 is at the reference position, the two detecting portions of the 2-splitted photodetector 88 receive an equal quantity of light, but when the rotary arm 80 rotates, the quantity of light received by the one detecting portion located in the rotating side increases, while the quantity of light received by the other portion in the opposite side decreases, thus a lens position signal S can be obtained as a difference signal of the two photodetecting portions.

Referring to FIG. 4 again, a lens position signal generating circuit 162 will be explained. The light received by the two photodetecting portions of 2-splitted photodetector 88 are input to the non-inverted input terminal and inverted input terminal of a differential amplifier 762, through the resistors R21 and R22. The differential amplifier 762 outputs a lens position signal LPS. The lens position signal LPS is voltage/current controlled by an amplifier 662, after phase compensation by the phase compensation circuit 622, and is used to drive the voice coil motor 26. Phase compensation will be explained later.

The servo system, consisting of the 2-splitted photodetector 88, lens position signal generating circuit 162, phase compensation circuit 622 and amplifier 662, drives the VCM 26 so that the rotary arm 80 is always in the reference position, namely the beam 280 passes through the center of objective 36. Accordingly, access to the target track is carried out by cooperation of one servo system which drives the objective 36 for moving the beam to the target track, and another, independent servo system which describes the VCM 26 so that the objective 36 is in the reference position.

Next, the tracking error signal generating circuit 16 of FIG. 4 will be explained with reference to FIG. 7.

The 4-splitted photodetector 40 mounted to the optical head 12 has four photodetecting portions and respectively outputs the quantity of light A, B, C and D. The far field method is considered here as an example of the tracking error signal generating method. The tracking error signal generating circuit 16 inputs the outputs of the photodetecting portions A, D to the non-inverted input terminal of the differential amplifier 76 through the resistors R1 and R2 and also inputs the outputs of the photodetecting portion B, C to the inverted input terminal of the differential amplifier 76 through the resistors R3 and R4 and thereby generates a tracking error signal TES, $$TES = (A+D) - (B+C)$$

as an error signal of such inputs.

Figure 7:
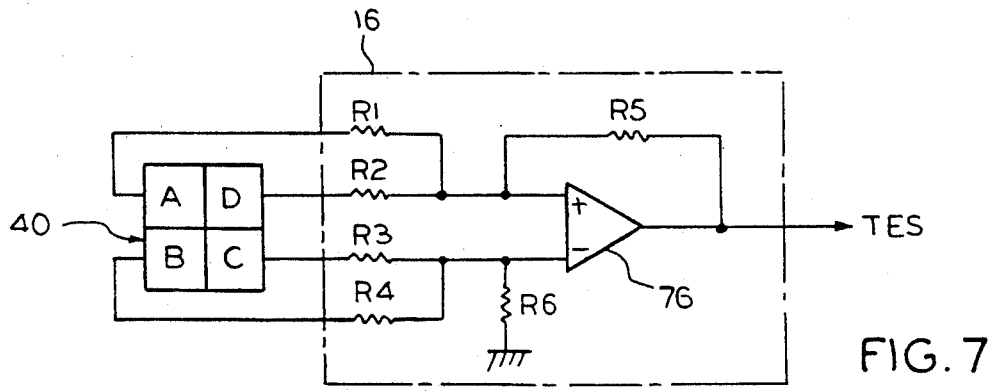
FIG. 7 is a diagram for explaining a tracking error signal generating circuit in the apparatus of FIG. 4.
Figure 8:
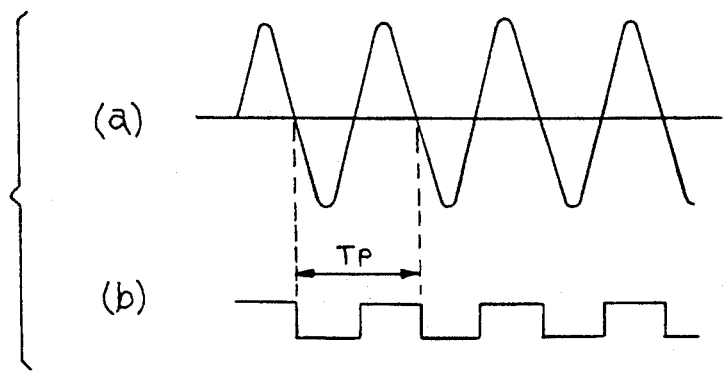
FIG. 8 is a diagram for explaining the tracking error signal.

The tracking error signal TES output from the tracking error signal generating circuit 16 of FIG. 7 has a signal waveform which repeats changes of cycles for each track pitch Tp as shown in FIG. 8(a) when the beam spot moves at a constant speed crossing the tracks of the optical disk 10. Accordingly, as shown in FIG. 8(b), the zero cross period which gives track pitch Tp is detected and the beam moving speed can be obtained as an inverted number of such value. However, in actuality, there is a problem here in that the beam moving speed, based on the zero cross period, is detected once in every other track pitch in order to eliminate DC offset of the tracking error signal TES. As a result, the quantity of information from which beam speed can be determined becomes small when the beam speed is low. This problem, however, can be solved by the present invention.

A focusing error signal generating circuit 161 shown in FIG. 4 is subsequently explained. Here, the astigmatic method is considered as an example of the focusing error signal generating method. The focusing error signal FES is generated as $$FES = (A+C) - (B+D).$$

During the tracking control, the tracking error signal TES and focusing error signal FES are input respectively to the phase compensation circuits 62 and 621. After the phase compensation, these are respectively input to the amplifiers 66 and 661, then voltage/current converted and applied to the tracking coil 78 in the tracking actuator 14 and focusing coil 90 of focusing actuator 42.

The analog/digital converter 70 and digital/analog converters 72, 74 shown in FIG. 4 will now be explained. The analog/digital converter (ADC) 70 converts the analog TES generated by the tracking error signal generating circuit 16 to a digital value of 8 bits and then outputs it to a data bus 101 of microprocessor unit (MPV) 100. The data bus 101 is structured by 8 signal lines $d_0 \sim d_7$. ADC 70 is enabled when a chip select signal CS1 is input from the decoder 73, at which time an analog voltage is converted to a digital value and the digital value is output to the data bus 101. The chip select signal will be explained later.

The digital/analog converters (DAC) 72 and 74 convert a digital value input through the data bus 101 from MPU 100 into an analog voltage. DAC 72 and 74 respectively convert the digital values input from the data bus 101 at this time into analog voltages when chip select signals LS3 and CS4 are input from the decoder 73, and then output to the phase compensation circuit 62 and adder 64, respectively.

Now, a control switch 60 of FIG. 4 will be explained. The switch 60 is turned ON and OFF with an output of a flipflop FF 61. When an output of FF 61 is logic "1", the switch 60 turns ON. When an output of FF 61 is logic "0", the switch 60 turns OFF. FF 61 inputs the signal line $d_0$ of data bus 101 and a chip select signal CS2, and outputs the value of signal line $d_0$ to the switch 60 when the chip select signal CS2 is input to the FF 61.

The decoder 73 of FIG. 4 will now be explained. The decoder 73 inputs an address information from MPU 100 through an address bus 102. Meanwhile, addresses are set by MPU 100 for ADC 70, DAC 72, DAC 74 and switch 60, and the decoder 73 analyzes address information input from MPU 100 and sends any one of the corresponding chip select signals CS1, CS2, CS3 and CS4 when an address corresponding to ADC 70, DAC 72, DAC 74 and switch 60 is detected.

Figure 9:
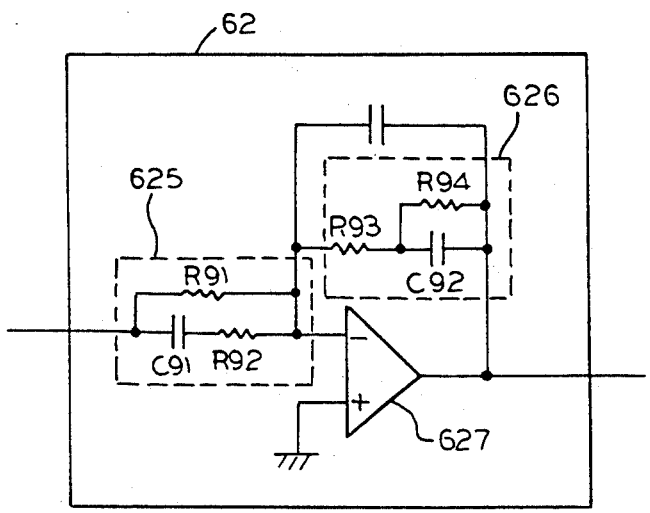
FIG. 9 is a diagram for explaining the phase compensation circuit in the apparatus of FIG. 4.

Thereafter, a phase compensation circuit 62 of FIG. 4 will be explained with reference to FIG. 9. The phase compensation circuit 62 of FIG. 9 is an example of an ordinary phase compensation circuit. If the servo system is unstable, it must be stabilized by inserting a stabilized compensation element. The phase compensation circuit 62 of FIG. 9 includes a circuit 626 as the phase delay compensation element and a circuit 625 as the phase lead compensation element.

The circuit 625, which is the phase lead compensation element, is formed by resistors R91, R92 and a capacitor C91. This circuit improves the response characteristic of the servo system, and also stabilizes an unstable system.

On the other hand, the circuit 626, which is the phase delay compensation element, is formed by resistors 93, 94 and a capacitor C92. This circuit improves the steady characteristic without deteriorating the stability of the servo system.

A microprocessor unit (MPU) 100 of FIG. 4 will be explained. MPU 100 inputs instructions such as an access instruction from a host controller 99. MPU 100 includes a microprogram execution unit 103, a random access memory (RAM) 106, a register group 105 and a timer 104.

Track access control by the MPU 100 is outlined as follows. When an access instruction, namely a track address of a target track is input to MPU 100 from the host controller 99, MPU 100 turns OFF the control switch 60 to cut the tracking servo loop based on the tracking error signal TES.

On the other hand, MPU 100 previously stores the information to generate the target tracking error signal for moving the beam spot to the target track in the RAM 106.

The target tracking error signal includes three target tracking error signals for acceleration, constant speed and deceleration, and the data required for generating this target tracking error signal is stored in the RAM 106. The execution unit 103 of MPU 100 reads data of RAM 106, conducts arithmetic operations and generates the target tracking error signal.

MPU 100 takes the actual tracking error signal TES, obtained on a realtime basis from ADC 70. A positional error is obtained by subtracting the actual tracking error signal TES from the target tracking error signal generated by MPU 100. This positional error data is set to DAC 72 and is then converted to an analog voltage. After the phase compensation in the phase compensation circuit 62, the signal is applied to the track actuator 14 for the servo control through the adder 64 and power amplifier 66.

Figure 1:
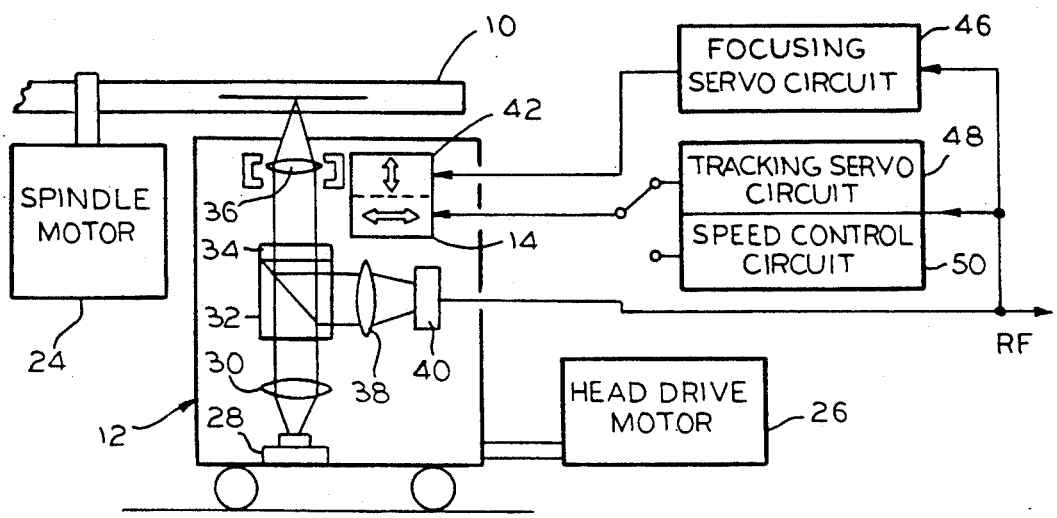
FIG. 1 is a structural diagram of conventional optical disk apparatus.
Figure 2:
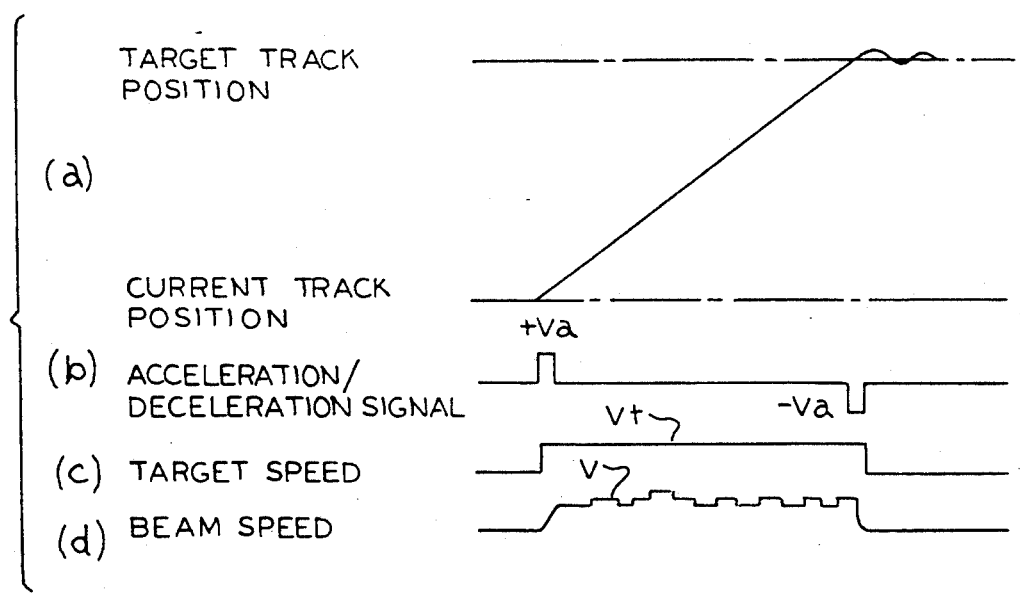
FIG. 2 is a diagram for explaining signal waveforms in conventional track access control systems.

The DAC 74 outputs an acceleration or deceleration signal which is similar to that shown in FIG. 2. The acceleration data is set to MPU 100 at the time of initiating access, and the MPU 100 outputs an acceleration voltage +Va to the adder 64 for a constant period. Moreover, at the time of deceleration, immediately before the end of access, the deceleration data is set by MPU 100 and a deceleration voltage −Va is output to the adder 64. Under the intermediate condition where constant speed control is carried out, the output voltage of DAC 74 is set to zero.

Moreover, MPU 100 inverts the polarity of the target tracking error signal generated for obtaining the positional error difference in every half cycle, to always keep the change in the same polarity direction. With such polarity change of the target tracking error signal, such polarity change is also carried out for the tracking error signal TES obtained from ADC 70, in synchronization with the polarity switching of the target tracking error signal. Thereafter, a positional error is obtained by subtraction between the target tracking error signal having changed polarity and the actual tracking error signal.

Figure 10:
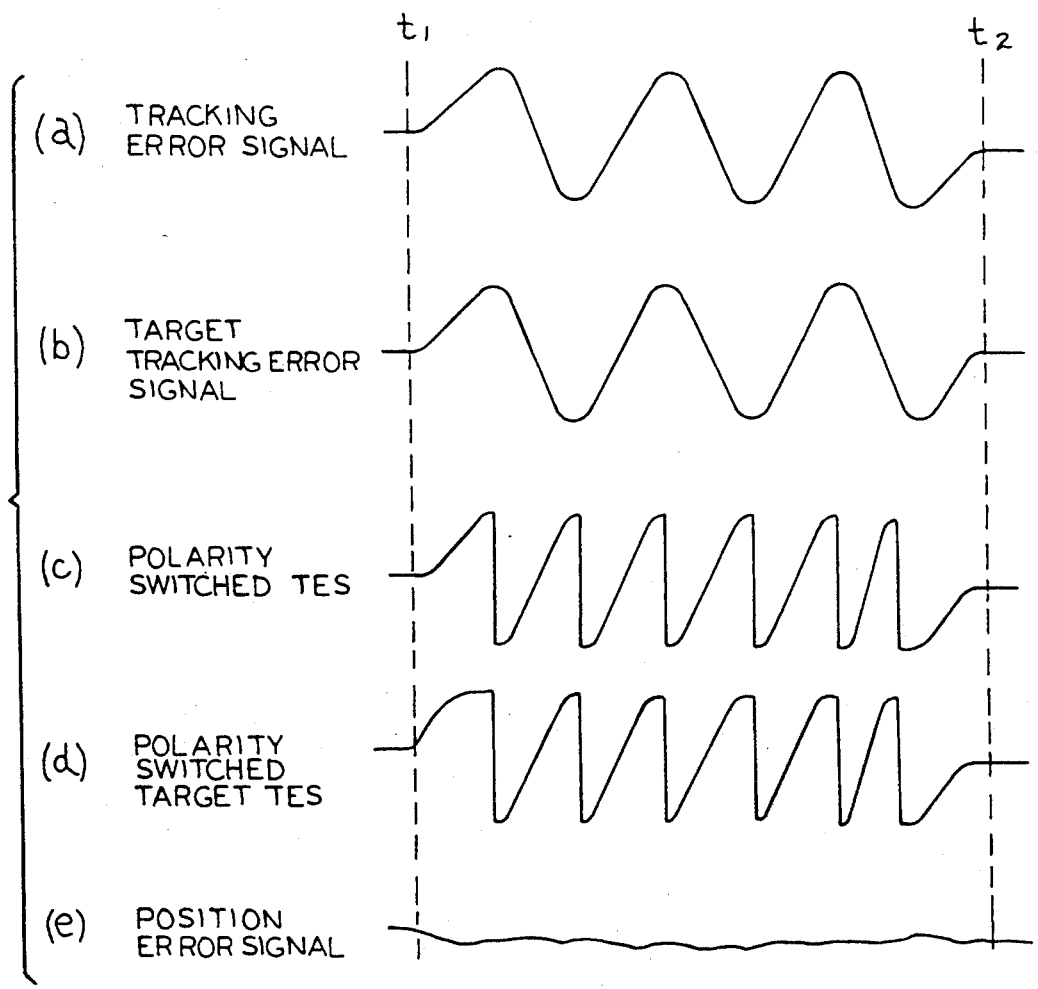
FIG. 10 is a diagram for explaining signal waveforms in the track access control system of the embodiment of FIG. 4.

Exemplary waveforms of signals processed are shown in FIG. 10.

In FIG. 10, when it is assumed that the track access control is initiated at the time t1, the tracking error signal TES follows the cycle shown in FIG. 10(a) for each track crossover, until the end of access at the time t2.

Meanwhile, MPU 100 generates the target tracking error signal shown in FIG. 10(b), and moreover converts the polarity of the part of the target tracking error signal which has a negative slope so that the target tracking error signal always changes to increase in the positive direction, as shown in FIG. 10(d). In synchronization with the polarity change of the target tracking error signal, the tracking error signal TES also changes signal polarity so that it changes in the same direction, as shown in FIG. 10(c). The positional error signal in FIG. 10(e) can be obtained by subtracting the tracking error signal TES of FIG. 10(c) from the target tracking error signal of FIG. 10(d), and the servo control of track actuator 14 for moving the beam is carried out so that the positional error signal can be minimized, namely the actually obtained tracking error signal TES matches the target tracking error signal.

Next, a method of generating the target tracking error signal in MPU 100 is explained. The output voltage of the tracking error signal becomes zero when the beam spot is in the center of the track. The output voltage is generated depending on the deviation of the beam spot from the center of the track. Moreover, when the beam spot crosses a plurality of tracks, the same output voltage waveform is periodically generated for each track cross over.

To generate the target tracking error signal, the following data is needed; first, an output voltage value of the tracking error signal corresponding to the position of the beam spot between the tracks when the beam spot moves to the adjacent tracks from a certain track; second, the beam spot position from initiation of access control to the end of control. The beam spot position means the position between a certain track and an adjacent track. This data is necessary only when movement of the beam spot is accelerated or decelerated. When the beam spot moves at a constant speed, the beam spot position can be obtained by adding the distance in which the beam spot moves during a certain constant time to the previous beam spot position.

A method of generating the target tracking error signal in this embodiment will now be explained.

FIG. 11(a) is a diagram for explaining Table 1 provided in the RAM 106 of MPU 100 of FIG. 4. As shown in FIG. 11(b), the one track pitch Tp of optical disk 10 is divided, for example, into 1/256 increments and the voltage value of the target tracking error signal in each divided position is stored as digital data.

Table 1 has the addresses $x=0 \sim 256$ and each address x stores the data $T(x)=T0 \sim T256$ as the voltage values of the standard tracking error signal shown in FIG. 11(b). More specifically, the address $x=0$ stores $T(0)=T0=0$, the address $x=64$ of $\frac{1}{4}$ cycle stores $T(64)=T64=+V$, the address $x=128$ of $\frac{1}{2}$ cycle stores data $T(128)=T128=0$ volt, the address $x=192$ of $\frac{3}{4}$ cycle stores data $T(192)=T192=-V$ and the last address $x=256$ stores data $T(192)=T256=0$. The data $T(X)$ of Table 1 is stored in the addresses from address $BA_1$ to address $(S(BA_1)+256)$ with the address $BA_1$ used as the base address.

FIG. 12(a) is a diagram for explaining Table 2 provided in the RAM 106 of MPU 100. This table stores the data $DA(t)=D_0\sim D_{n-1}$ in the addresses $t=0\sim n-1$ and also stores the data $DA(n)=DA_n$ in the address $t=n$. The data $DA(t)$ of Table 2 is stored in the addresses from the address $DA_2$ to address $(DA_2+n)$ with the address $DA_2$ used as the base address.

Table 2 is used for acceleration control. When the time t is plotted on the horizontal axis, with the beam moving distance on the vertical axis, as shown in FIG. 12(b), the addresses $t=0\sim n-1$ are set for each unit time of every 20 μs from initiation of acceleration. The specified acceleration curve is determined for each address given by such time axis and the beam moving distance in every 20 μs after $(20\times n)$ μs from initiation of acceleration is stored in the addresses $t=0\sim n-1$. For example, a change of beam distance $DA_4$ from the address 4 to 5 (namely, from 80 μs to 100 μs after initiation of acceleration) is stored in the RAM 106 as the data $DA(4)=DA_4$ in the address $t=4$. The data $DA(t)$ stored in the RAM 106 does not store the beam moving distance itself, but registers the length equal to 1/256 of one track pitch Tp, namely the number in units of Tp/256, as shown in FIG. 11(b). For instance, when $DA_4=5$, the actual beam moving distance is given as $(Tp/256)\times 5$.

The reason for forming Table 2 is that access control by MPU 100 is executed by interruption of timer 104, which generates an interruption every 20 μs. The information indicating the position of the beam in each interrupt timing is obtained first using the Table 2. The information indicating this position shows the address x of Table 1, shown in FIG. 11(a). Therefore, a voltage value T(x) of the target tracking error signal in such position x is extracted by referring to Table 1.

In addition, in Table 2 of FIG. 12(a), the address $n+1$ is added, following the acceleration end address $t=n$. The address $t=n$ stores the moving distance during the period from the time after $(20\times n)$ μs after initiation of acceleration to the time after $(20\times(n+1))$ μs, namely in the 20 μs period of constant speed control after the end of acceleration control. The data $DA(t)=DAn$ of this address $t=n$ is repeatedly used every 20 μs for constant speed control after the acceleration control.

Figure 13A:
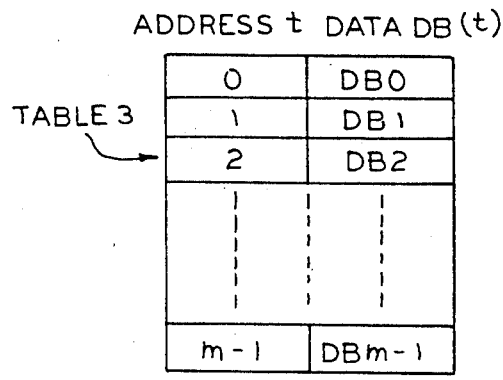
FIG. 13(a) illustrates an example of Table 3 of FIG. 4.

FIG. 13(a) is a diagram for explaining Table 3 of RAM 106 of MPU 100, shown in FIG. 4. Table 3 is used for deceleration control in the track access control of the present invention.

Figure 13B:
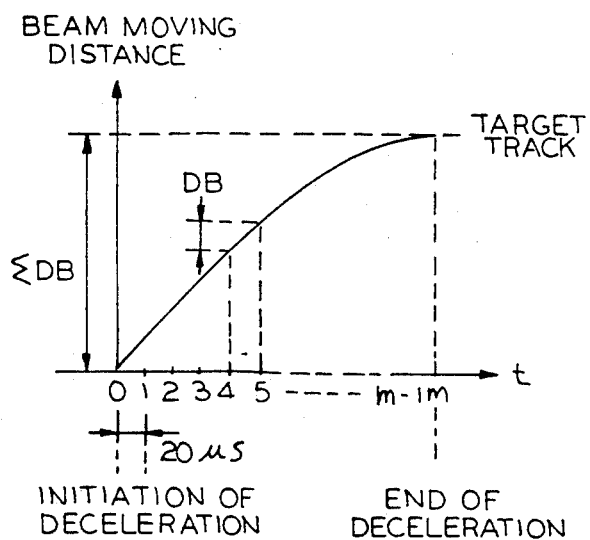
FIG. 13(b) illustrates the time/distance relationship during deceleration based on Table 3.

Table 3, shown in FIG. 13(a), is formed by the addresses $t=0\sim m-1$ and data $DB(t)=DB_0\sim DB_{m-1}$. This table information is determined on the basis of the standard deceleration curve when the time is plotted on the horizontal axis and the beam moving distance on the vertical axis, as shown in FIG. 13(b), so that the beam reaches the target track after $(20\times m)$ μs from initiation of deceleration. The addresses $t=0\sim m-1$ are set with a time interval of 20 μs from initiation of deceleration, and the beam moving distance in every 20 μs is registered as the data DB. For instance, the beam moving distance is $DB_4$ when the address t changes to 5 from 4 and data $DB(4)=DB_4$ is stored in the address $t=5$. Like Table 2, of FIG. 12, the data $DB_4$ does not mean the actual beam moving distance but is the number in units of length equal to Tp/256 (Tp: track pitch), as shown in FIG. 11(b). For example, when $DB_4=5$, the actual beam moving distance is given by $(Tp/256)\times 5$.

Moreover, in Table 2 of FIG. 12, a total sum $\Sigma DA$ of data DA shows the beam moving distance by the acceleration control, and a total sum $\Sigma DB$ of data DB in Table 3 of FIG. 13 shows the beam moving distance by the deceleration control.

Figure 14:
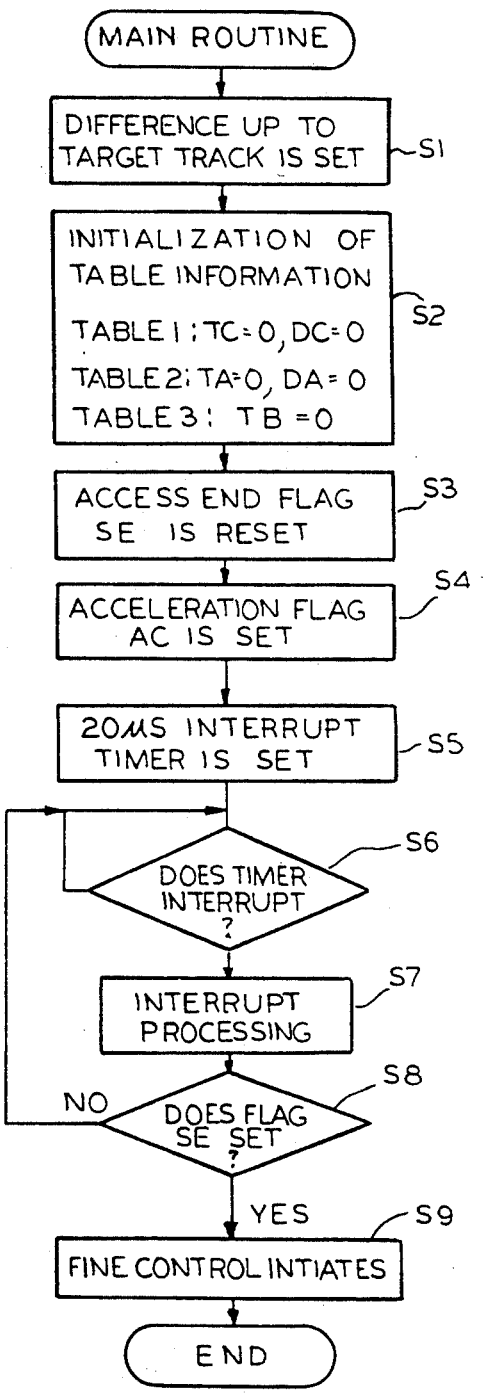
FIG. 14 is a flowchart of the main routine operation in the embodiment of FIG. 4.

FIG. 14 is a flowchart of the main routine operation in the track access control of this embodiment.

In FIG. 14, when an access instruction is issued to MPU 100 from the host controller 99, the number of remaining tracks up to the target track, called the access difference, is computed. The access difference is set to the register D in the step S1. Next, a register to which information of each table is set for accessing tracks is initialized in the step S2. More specifically, the address register TC and data register DC are used for Table 1, and these are respectively initialized to zero. Moreover, for Table 2, the address register TA and data register DA are used, and these are also initialized to zero. In addition, for Table 3, the address register TB and data register DB are used. Moreover, only the address register TB is initialized to zero. The registers TC, TA, TB and data registers DC, DA, DB are indicated only as registers TC, TA, TB and registers DC, DA, DB.

Next, a seek end flag SE is reset in step S3, and an acceleration flag AC is set in step S4. Subsequently, a timer 104, which issues an interrupt every 20 μs is set in step S5 to enable the interrupt control every 20 μs.

Next, it is decided whether an interrupt is issued from the timer 104 in step S6. When an interrupt is issued, the access control is carried out depending on the error between the actual tracking error signal and target tracking error signal in step S7. Details of this process will be explained later.

Thereafter, in step S8, it is checked whether the seek end flag SE is turned ON in step S8. When it is ON, it means the end of access control. The fine servo switch, namely the control switch 60 shown in FIG. 4, is turned ON in step S9 to initiate the fine control (tracking control) to cause the beam to follow the target track. At that time, the process is completed.

Figure 15:
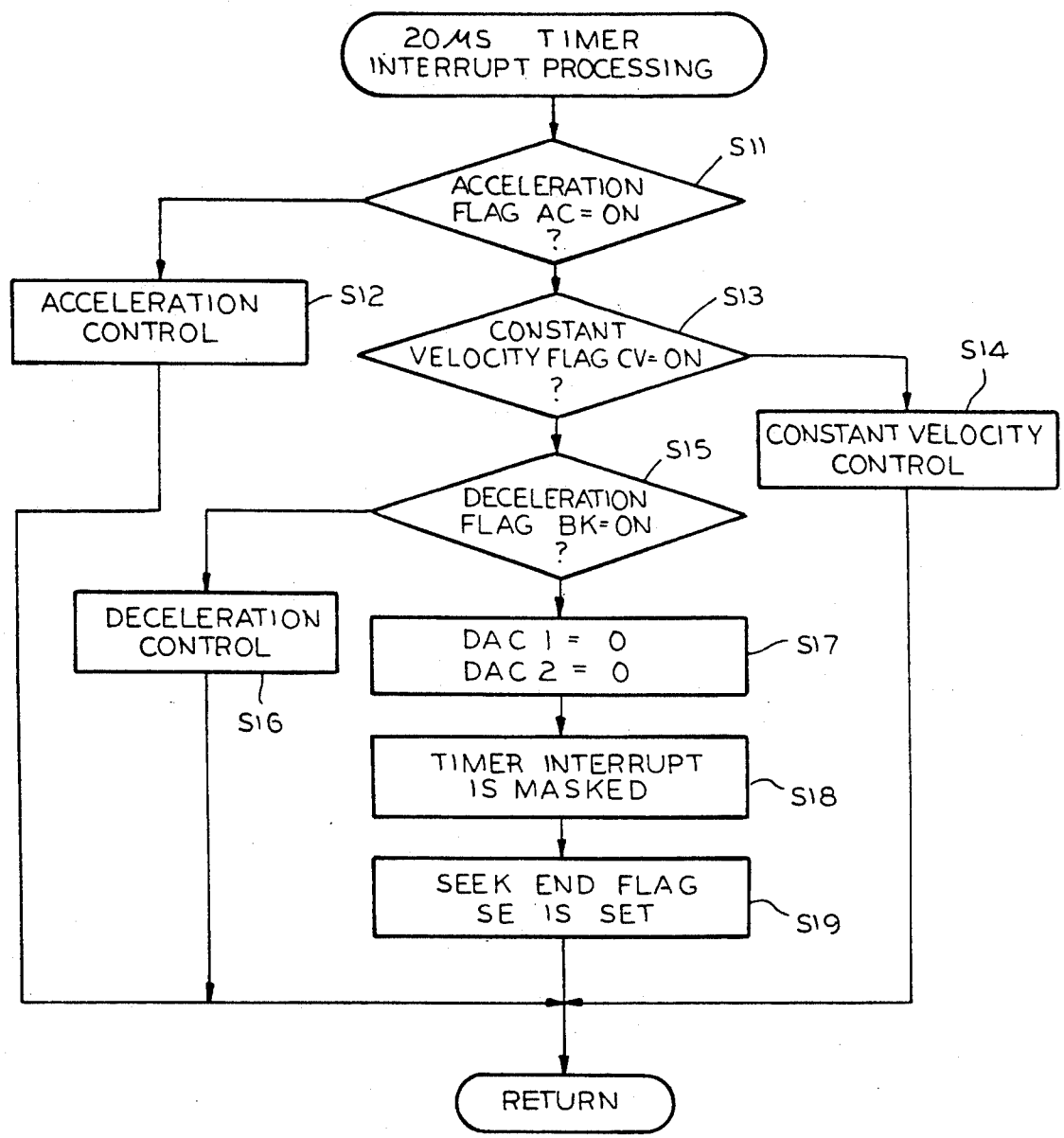
FIG. 15 is a flowchart of the timer interrupting operation in the embodiment of FIG. 4.

FIG. 15 is a flowchart of operation to be carried out in step S7, where the interrupt generated in every 20 μs by the interrupt timer 104 set in step S5 is executed.

Here, the interrupt time 20 μs (interval of interrupt) is set because the track servo bandwidth of an ordinary optical disk apparatus is 5 kHz. The frequency of position information required for track access control of the present invention without changing the constants of track servo and phase compensation is at least 25 kHz or more, which is about five times or more of the track servo bandwidth. The position information signal having a frequency of 25 kHz, must be sampled at a frequency of 50 MHz and the interrupt interval of 20 μs is set to carry out the sampling at the frequency 50 MHz. Moreover, as the MPU 100 executes the flow of FIG. 15 - FIG. 18 by receiving the interrupt from the 20 μs timer, a recently available digital signal processor (DSP) for digital servo of a magnetic disk apparatus can be used. A typical DSP is TMS 320C25 made by Texas Instruments, Inc.

In FIG. 15, when the process is triggered by the interrupt from 20 μs timer 104, it is checked whether the acceleration flag AC is turned ON or not in step S11. In this case, since the acceleration flag AC is set in step S4 of FIG. 14, the acceleration control of step S12 is executed. The acceleration control of step S12 is indicated in detail in FIG. 16. When the acceleration control is completed, the acceleration flag AC is reset and a constant velocity flag CV is set.

When an interrupt of 20 μs timer is received after the end of acceleration control, it is decided whether the constant velocity flag CV is turned ON, in this case, in step S13. If so, the constant velocity control of step S14 is carried out. The constant velocity control of step S14 is indicated in detail in FIG. 17. When the interrupt of the 20 μs timer is received after the end of the constant velocity control, it is determined whether the deceleration flag BK is turned ON in step S15, and the deceleration control of step S16 is carried out. The deceleration control of step S16 is indicated in detail in FIG. 18.

When deceleration control is completed, zero is respectively set to DAC 72, DAC 74 of FIG. 4 in step S17. The timer interrupt is masked in step S18. Thereafter, the seek end flag SE is set in step S19 and the process returns to the main routine of FIG. 14, completing the process.

The acceleration control of the present invention shown in FIG. 16 will now be explained.

When an access instruction is issued to MPU 100 of FIG. 4 from the host controller 99, the acceleration control shown in FIG. 15 is repeated for each interrupt of the 20 μs timer 104.

This acceleration control reads, in step S21, the data DA(TA) of Table 2, shown in FIG. 12(a), and sets the data DA(TA) to the register A for each cycle. In the initial condition, the register TA is set to 0, the data $DA(0)=DA_0$ is read from Table 2, and $DA_0$ is set to the register A.

Next, in the step S22, the sum content of register DA and register A is set to the register DA to detect the current position of the beam. Since the register DA is set to 0 in the initial condition, $DA_0$ is set to the register DA indicating that the beam is located a distance DAc from the access initiation position.

In the step S23, it is decided that the register DA indicating the current position is set to 256, namely it is checked whether the beam has exceeded one track pitch or not. When the beam does not exceed the one track pitch, the process moves to step S25. When the beam has exceeded one track pitch, 256 is subtracted from the register DA in step S24 to reset a value to the moving distance from the initial position of one track pitch. Moreover, when the beam has moved one track, the number of the difference register D is reduced by one.

In step S25, the data T (DA) of Table 1 shown in FIG. 11 is read with the value of register DA indicating the current position used as the address x of Table 1, and the data T(DA) is set to the register X as the voltage value of the target tracking error signal.

With the process of step S25, a voltage value of the tracking error signal corresponding to the current beam position in the one track pitch shown in FIG. 11(b) is set to the register X.

In the step S26, the register TA is updated by one and in step S27, the register TA =n, namely acceleration end or not is decided. When the register TA is not n, the process moves to the step S29. When the acceleration end is decided, the acceleration flag AC is cleared in step S28. Simultaneously, the constant velocity flag CV is set and a value of register DA, indicating the current position computed in step S22, is set to the register CV used for the constant velocity controller.

In step S29, a voltage value ADC of tracking error signal TES is read from an output of ADC 70 and this value is set to the register Y. In step S30, positional deviation is calculated and it is then set to the register Z. Namely, a positional deviation Z is obtained by subtracting a value of register Y, which is a voltage value of the actual tracking error signal TES, from the value of register X, which is the target tracking error signal calculated in step S25.

Next, in step S31, polarity switching is checked. Namely, it is checked whether a value of register DA is in the range from 64 to 192 as shown in FIG. 11(b). When it is in the range from 64 to 192, the polarity of positional deviation Z is inverted in the step S32. When DA is in the range from 0 to 64 and from 192 to 256 in step S31, polarity switching is not carried out and a positional deviation Z, computed in step S30, is used as it is. Finally, in step S33, a value of register Z is set to DAC 72 as DAC1. The value Z is then converted to an analog voltage, and is thereafter applied to the adder 64 through phase compensation in the phase compensation circuit 62. Simultaneously, an acceleration voltage (constant value) is set as DAC2 to the DAC 74. It is then converted to an analog acceleration voltage, added to the deviation voltage after phase compensation and applied as acceleration control to the tracking actuator 14 with the power amplifier 66.

Figure 16:
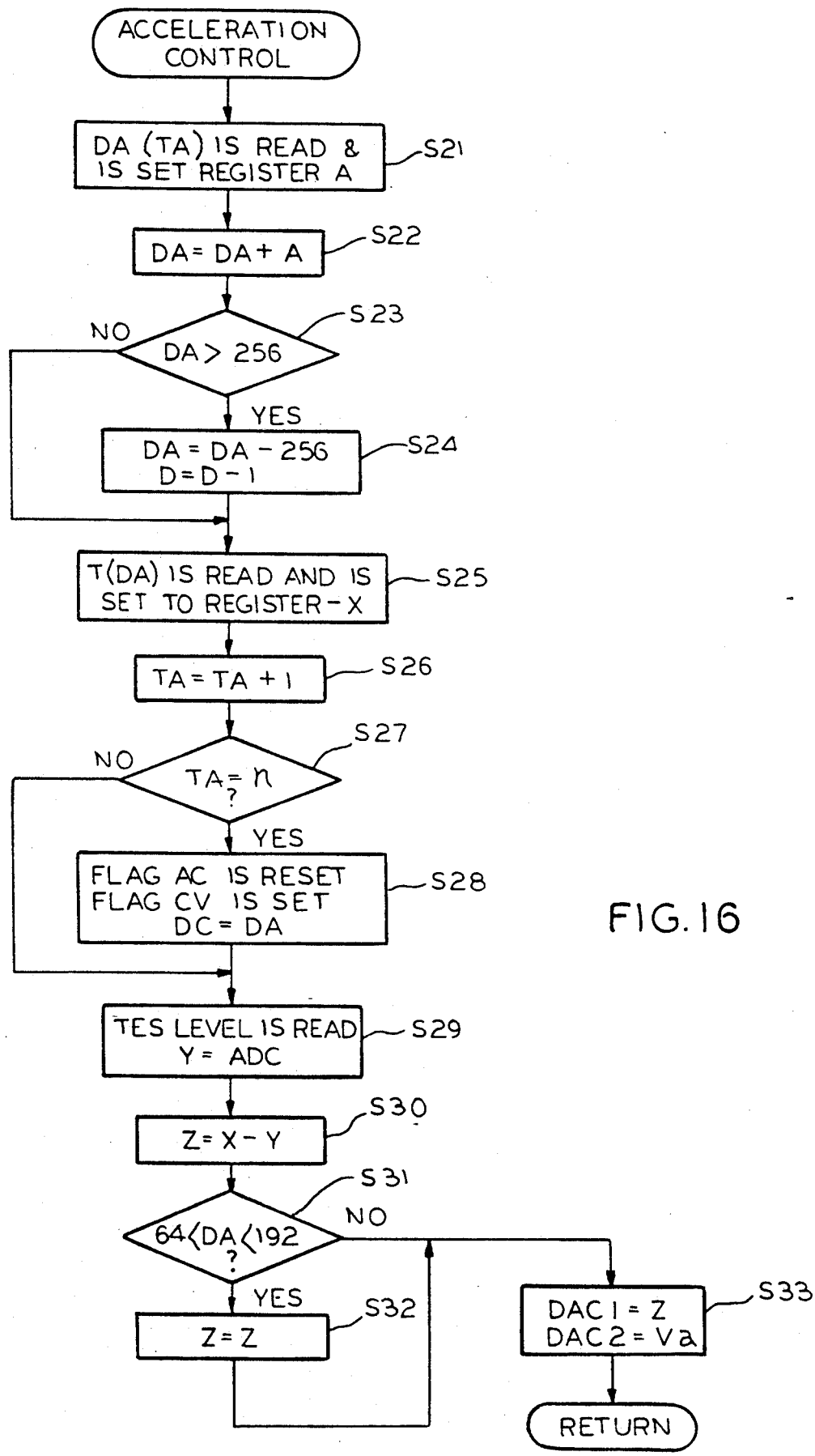
FIG. 16 is a flowchart of the acceleration control operation in the embodiment of FIG. 4.

With repetition of this acceleration control process in every interrupt of the 20 μs timer shown in FIG. 16, the servo control of actuator 14 carries out beam movement such that the actual tracking error signal TES follows the target tracking error signal during acceleration, through the use of Table 1 and Table 2 shown in FIG. 11 and FIG. 12. Accordingly, the beam speed is smoothly accelerated toward the determined target track.

Figure 17:
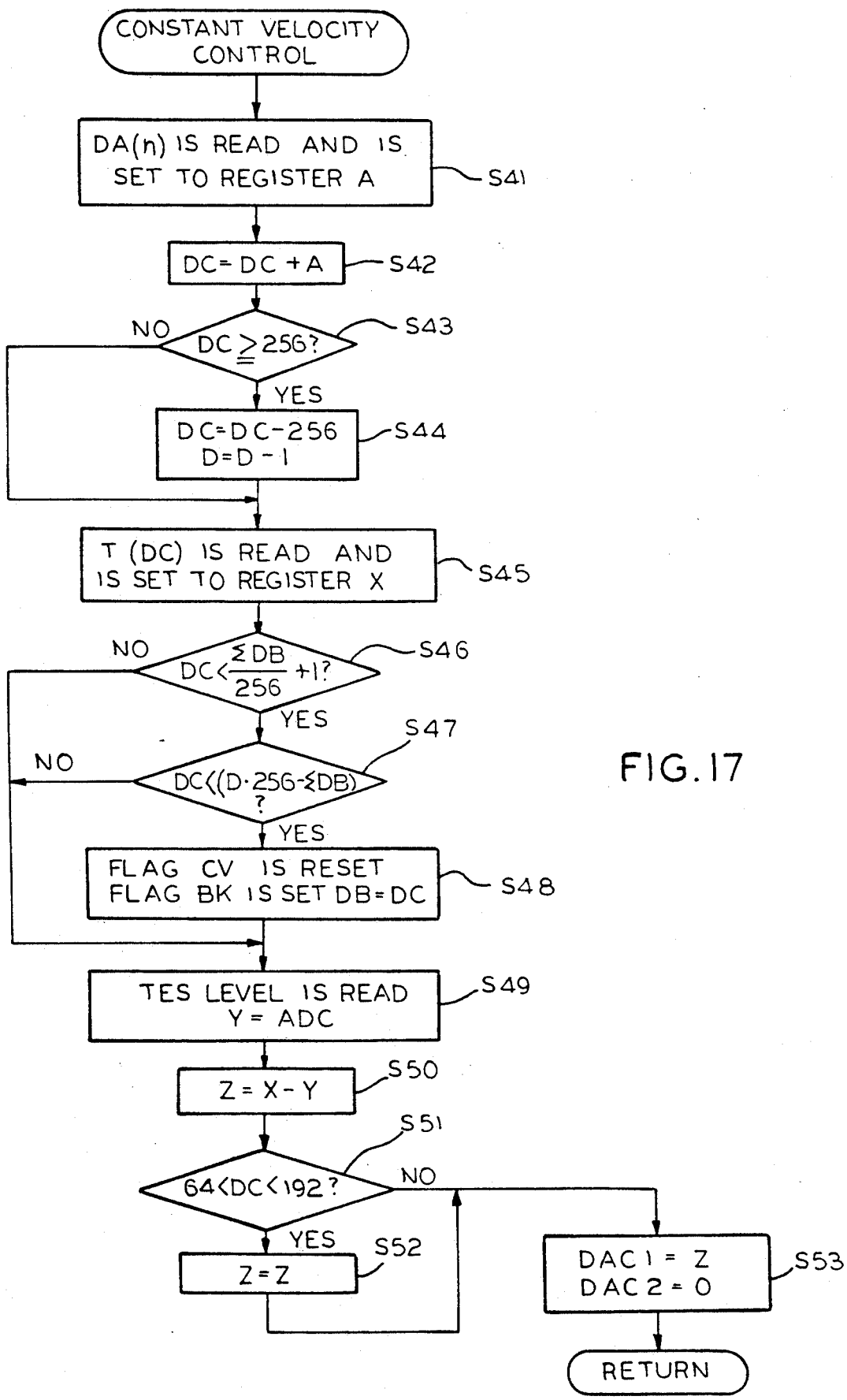
FIG. 17 is a flowchart of the constant speed control operation in the embodiment of FIG. 4.

In the acceleration control process of FIG. 16, when the acceleration time of 20 μs x n has been completed, the constant velocity control shown in FIG. 17 is initiated.

In the constant velocity control of FIG. 17, the data DA(n)=DAn of address t=n in Table 2 is read in step S41, and DAn is set to the register A. Next, in step S42, the content of register A is added to the register DC. In this case, the register DC indicates the beam position in the one track pitch (Tp)/256 like the register DA in the acceleration control of FIG. 16, and the current beam position is calculated by adding the moving distance DA (n) =DAn during 20 μs in the constant velocity control (set to the register A) to the beam position when the acceleration is completed.

Next, in step S43, it is checked whether the beam has moved one track pitch or not by comparing the register DC with 256. When the moving distance is within one track pitch, the process moves to step S45. When the moving distance exceeds one track pitch, 256 is subtracted from the register DC in step S44 to reset the movement within one track pitch. Since the light beam has moved one track pitch, one is subtracted from the difference register D.

In step S45, the data T(DC) of Table 1 is read using the value of register D calculated in step S42, and a voltage value T(DC) of the target tracking error signal corresponding to the current beam position within Tp/256, shown in FIG. 6(b), is set to the register X.

Thereafter, in step S46, it is decided whether the difference register D indicating the remaining tracks has reached the remaining distance required for change of speed of the beam as determined by Table 3. Namely, as is apparent from FIG. 13, the beam moving distance required for deceleration control is given as a total sum $\Sigma DB$ of data DB(t) in Table 3. A track pitch conversion value is obtained by dividing such total sum by 256. It is also decided, in step S46, whether or not the beam has reached the position one track pitch before the remaining distance required for deceleration control. When it is decided in step S46 that the beam has reached one track pitch before the remaining distance required for deceleration, the distance $\Sigma DB$ required for deceleration is subtracted, in step S47, from the value obtained by multiplying 256 (division number of one track pitch) to the difference register D indicating remaining tracks. When the value of register DC indicating the current beam position is smaller than such value, the constant velocity control process is decided to be completed and the process moves to step S48. In step S46, comparison of one track is carried out and in step S47, comparison of (one track)/256 is carried out. In step S48, after completion of constant velocity control, the constant velocity flag CV is cleared. Simultaneously, deceleration flag BK is set, and a value of register DC indicating the current beam position is stored in the register DB.

In step S49, a voltage value of an actually obtained tracking error signal in ADC 70 is read and is set to the register Y. Thereafter, in step S50, the content of register Y indicating a voltage value of the actual tracking error signal read in step S49 is subtracted from the content of register X, indicating a voltage value of the target tracking error signal obtained in step S45, in order to obtain the positional deviation Z.

In the step S51, it is decided whether or not the register DC is in the range of $64 \sim 192$. When it is in the range of $64 \sim 192$, the polarity of positional deviation Z is inverted in step S52. Meanwhile, when it is not in the range of $64 \sim 192$, positional deviation Z of step S50 is used as it is. Finally, a value of register Z is set as DAC1 to DAC 72 in step S53, and simultaneously 0 is set as DAC2 to DAC 74. Then, phase compensation is carried out to the positional error voltage sent from DAC 72 and the track actuator 14 is controlled by the power amplifier 66. Thereby, the servo control is operated so that the actual tracking error signal TES follows the target tracking error signal.

Figure 18:
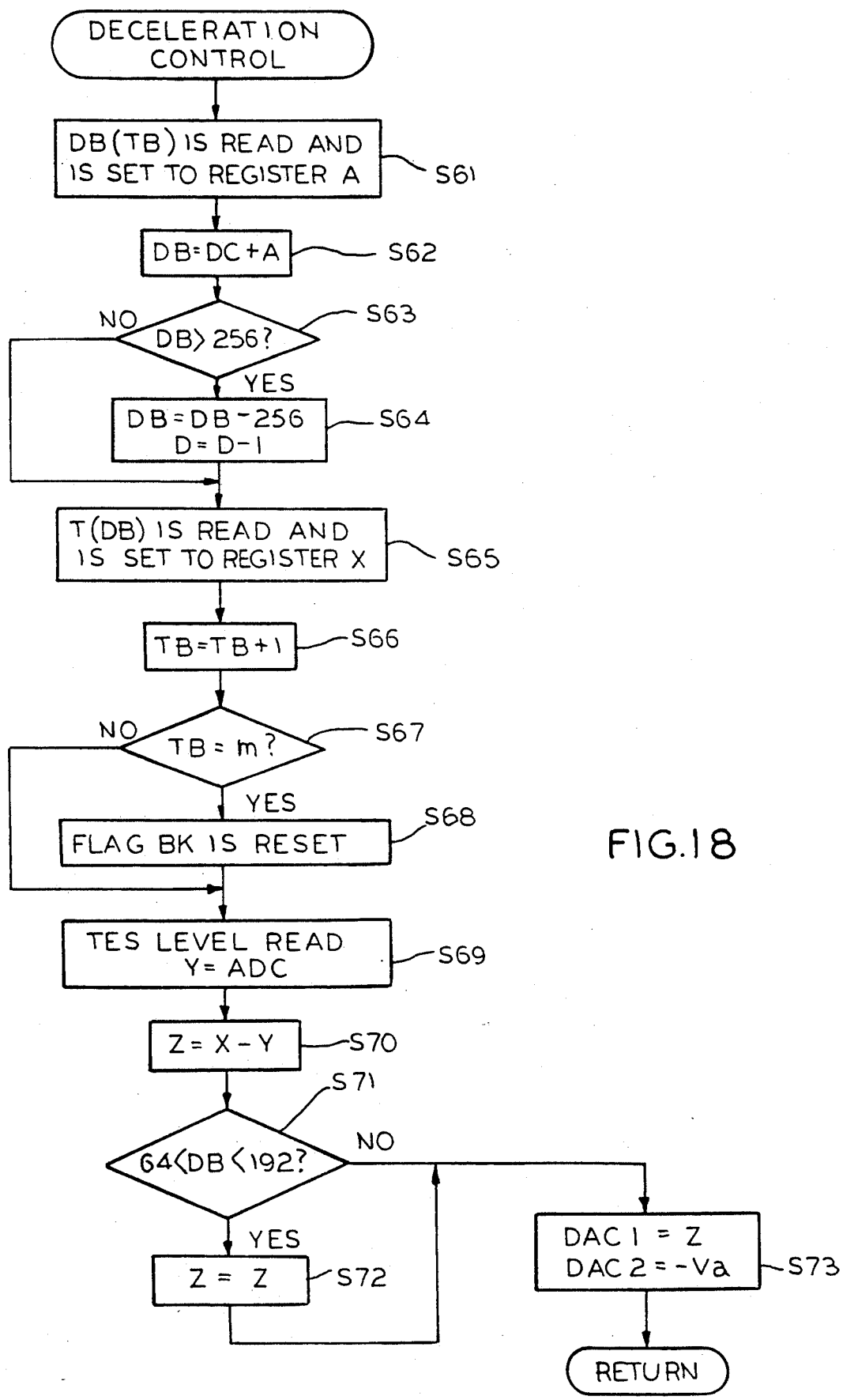
FIG. 18 is a flowchart of the deceleration control operation in the embodiment of FIG. 4.

When the constant velocity control of FIG. 17 is completed, the deceleration control of FIG. 18 is initiated.

In the deceleration control of FIG. 18, the data $DB(0)=DB_0$ of the first address TB=0 of Table 3 is read and is set to register A in step S61. The distance to the new beam moving position is obtained, in step S62, by adding the moving distance A after 20 $\mu s$, obtained from Table 3 and read in step S61, to DC which is obtained in step S45 of the final constant velocity control of FIG. 17. This sum is set as DB in step S48, which is the distance to the current beam position within one track pitch.

Next, in step S63, it is decided whether or not the register DB has exceeded 256, namely whether or not the beam has moved the one track pitch. When the moving distance is within one track pitch, the process moves to step S65. When the distance exceeds one track pitch, 256 is subtracted from the register DB in step S64, to reset the beam moving distance to within one track pitch. Since the beam has moved one track pitch, one is subtracted from the difference register D.

In step S65, the data T(DB) is read with the content of register DB indicating the current beam position obtained in step S62, used as the table address x of Table 1. The register DB is then set to the register X as a voltage value of the tracking error signal of FIG. 11(b).

Thereafter, the address TB of Table 3 is updated by one in step S66 and it is decided whether or not the content of register TB is m, namely, whether or not deceleration has completed, in step S67. When deceleration is not completed, the process moves to step S69. When deceleration is completed, the deceleration flag BK is cleared in step S68.

In step S69, a level of the actually obtained tracking error signal is read to the register Y from ADC 70. Positional deviation is set to the register Z in step S70, by subtracting register Y from register X. Next, in step S71, when the register DB is within the range of $64 \sim 192$, the process moves to step S72 and the polarity of the positional deviation Z is inverted. When the register DB is not in the range of $64 \sim 192$, the process moves to step S73. A value of register Z is sent as DAC1 to DAC72 in step 73. Simultaneously, a constant deceleration voltage is sent as DAC2 to DAC 74. Thereby, beam deceleration control is carried out by servo control of the track actuator 14, adding the positional deviation to the deceleration voltage.

When deceleration of the beam moving speed is completed by deceleration control in every 20 $\mu s$ shown in FIG. 18, an interrupt of 20 $\mu s$ timer 104 is issued, and the process moves to step S27 in the flow of FIG. 15. After DAC 72 and DAC 74 are set to zero, an interrupt of timer 104 is masked in step S68 and the seek end flag SE is set in step S69. Thereafter, the process returns to the main routine. When the seek end flag is ON in step S8, the fine control is initiated so that the beam, moved by turning ON the fine servo switch, namely the switch 60 in step S67, is caused to follow the target track. Thereby, the process of obtaining track access control is completed.

Figure 19:
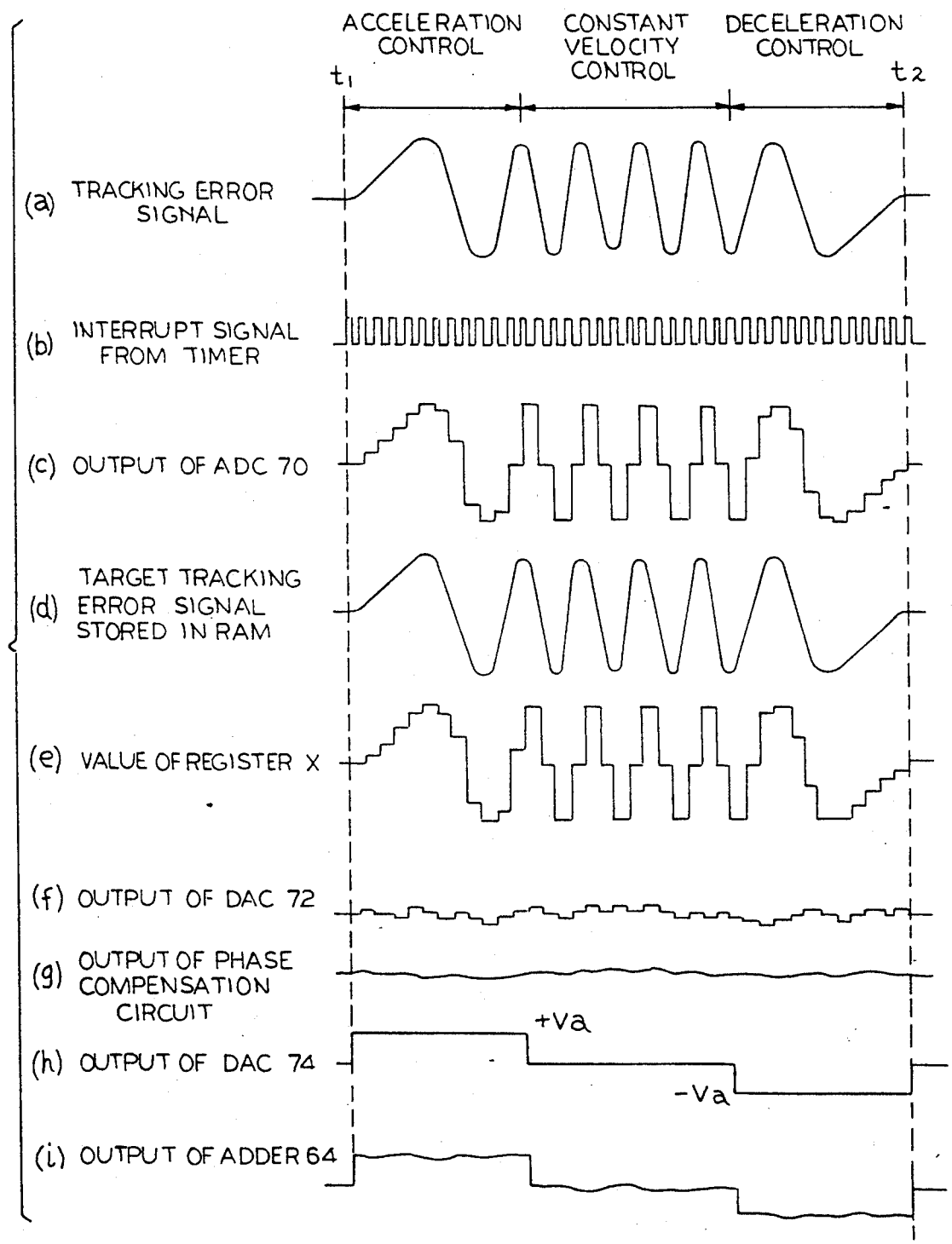
FIG. 19 is a diagram for explaining signal waveforms in the track access control system of the embodiment of FIG. 4.

FIG. 19 is a compilation of the signals indicated, as previously described. An access instruction is given at time $t_1$. The acceleration control process, constant velocity process and deceleration process are carried out by the track access control system until the time $t_2$, when the destination track is reached.

The track access oontrol system of the present invention, wherein the beam finds the target track based on the deviation between the target tracking error signal and actually obtained tracking error signal TES, may be utilized in parallel with conventional track access control systems based on speed control.

As explained above, the present invention realizes position control of the beam by causing the tracking error signal obtained in real time during the track access process to follow the predetermined target tracking error signal. Therefore, a sufficient quantity of information can be obtained, even if the beam moving speed is low, in comparison with the case where speed control is carried out by generating the beam moving speed from the tracking error signal and the beam movement to cause the tracking error signal to accurately follow the TES target value. Thereby, stability of track access can be improved by realizing stable on-track control when the beam enters the target track. In addition, the beam positioning time can be reduced.

While the principles of the invention have been described above in connection with specific apparatus and applications, it is to be understood that this description is made only by way of example and not as a limitation on the scope of the invention.

What is claimed is:

1. A track access control system for a disk storage system, the disk storage system including a rotatable recording disk on which a plurality of tracks are formed along a rotation direction of the rotatable disk, a head which can move in the radial direction of the disk to read data, means for moving the head to a target track depending on an access instruction which includes the target track, and a sensor for detecting crossing of the head over the tracks, the track access control system comprising:

real tracking error signal generating means for generating a real tracking error signal on the basis of an output of the sensor as the head crosses over the tracks;

analog/digital converting means for converting, at least some non-zero crossing signal values of said real tracking error signal, to a digital value of said real tracking error signal during track seek operation prior to fine position control of the head;

target tracking error signal generating means for generating a target tracking error signal depending on an access instruction from a host controller, said target tracking error signal generating means generating a digital value of said target tracking error signal depending on the access instruction from the host controller;

error detecting means for detecting a difference between said real tracking error signal and said target tracking error signal wherein said error detecting means includes subtracting means for computing a difference value between said digital value of said real tracking error signal and said digital value of said target tracing error signal;

digital/analog converting means for converting said difference value to a second analog signal; and head drive means for driving said head in response to an output of said error detecting means to reduce said difference wherein said head drive means drives said head in response to an output of said digital/analog converting means to reduce said second analog signal.

2. The system of claim 1 wherein said target tracking error generating means converts a polarity of said target tracking error signal at least every half cycle.

3. The system of claim 2 wherein said converting means converts a polarity of said real tracking error signal at least every half cycle.

4. A track control method for a disk storage system, the disk storage system including a rotatable recording disk on which a plurality of tracks are formed along a rotation direction of the rotatable disk, a head which can move in the radial direction of the disk to read data, means for moving the head to a target track depending on an access instruction which includes the target track, and a sensor for detecting crossing of the head over the tracks, the track access control method comprising the steps of:

generating a real tracking error signal on the basis of an output of the sensor as the head crosses over the tracks;

converting at least some non-zero crossing signal values of said real tracking error signal to a digital value of said real tracking error signal during track seek operation prior to fine servo control of the head;

generating a target tracking error signal depending on an access instruction from a host controller which includes generating a digital value of said target tracking error signal depending on the access instruction from the host controller;

detecting a difference between said real tracking error signal and said target tracking error signal wherein detecting includes subtracting a difference value between said digital value of said real tracking error signal and said digital value of said target tracking error signal;

converting said difference value to a second analog signal; and driving said head in response to said second analog signal to reduce said difference between signals.

5. The method of claim 4 further comprising the step of converting a polarity of said target tracking error signal at least every half cycle prior to detecting said difference.

6. The method of claim 5 further comprising the step of converting a polarity of said real tracking error signal at least every half cycle prior to detecting said difference.

7. A track access control method in a disk system which includes a disk having many tracks in the radial direction, a head which can move in the radial direction of the disk to read data, a sensor for generating a real tracking error signal which detects crossing of the head over the tracks, and means for controlling the head, comprising the steps of:

receiving an access instruction including a target track from a host controller, detecting the current track position of the head, storing the current track position of the head, determining whether the head has moved one track pitch, changing the track position stored in said storing means when the head has moved one track pitch, generating a real tracking error signal on the basis of an output of the sensor as the head crosses over the tracks;

generating a target tracking error signal in accordance with said access instruction, wherein generating said target tracking error signal comprises the steps of generating an acceleration target tracking error signal during a first predetermined time period during which the head accelerates, generating a constant velocity target tracking error signal for a second predetermined time period during which the head moves at substantially constant velocity, said second time period following said first time period, and generating a deceleration target tracking error signal for a third predetermined time period during which the head decelerates, said third time period following said second time period;

storing a first voltage value for the target tracking error signal corresponding to a desired position of the head and setting said first voltage value to a first register, storing a second voltage value for the real tracking error signal corresponding to the current position of the head and setting said second voltage value to a second register, calculating the difference between the voltage values in said first and second registers, and setting said difference to a third register, and converting said difference in said third register to an analog voltage, and using said analog voltage to adjust a voltage which is simultaneously applied to the head, so that the head moves toward the target track in a way which reduces said differences.

8. The method of claim 7 further comprising the step of converting at least some non-zero crossing signal values of said real tracking error signal to a digital value of said real tracking error signal during track seek operation control prior to fine position control of the head.

9. The method of claim 7 further comprising the step of converting a polarity of said target tracking error signal at least every half cycle prior to detecting said difference.

10. The method of claim 9 further comprising the step of converting a polarity of said real tracking error signal at least every half cycle prior to detecting said difference.

11. A track access control system for a disk storage system, the disk storage system including a rotatable recording disk on which a plurality of tracks are formed along a rotation direction of the rotatable disk, a head which can move in the radial direction of the disk to read data, means for moving the head to a target track depending on an access instruction which includes the target track, and a sensor for detecting crossing of the head over the tracks, the track access control system comprising:

real tracking error signal generating means for generating a real tracking error signal on the basis of an output of the sensor as the head crosses over the tracks;

target tracking error signal generating means for generating a target tracking error signal depending on an access instruction from a host controller wherein said target tracking error generating means includes, acceleration control means for generating an acceleration target tracking error signal during a first predetermined time period during which the head accelerates, constant velocity control means for generating a constant velocity target tracking error signal for a second predetermined time period during which the head moves at substantially constant velocity, said second time period following said first time period, and deceleration control means for generating a deceleration target tracking error signal for a third predetermined time period during which the head decelerates, said third time period following said second time period;

means for storing a first voltage value for the target tracking error signal corresponding to a desired position of the head and setting said first voltage value to a first register, means for storing a second voltage value for the real tracking error signal corresponding to the current position of the head and setting said second voltage value to a second register, means for calculating the difference between the voltage values in said first and second registers, and setting said difference to a third register, and means for converting said difference in said third register to an analog voltage, and head drive means for driving said head in response to said difference so that the head moves toward the target track in a way which reduces said difference.

12. The system of claim 11 further comprising means for converting at least some non-zero crossing signal values of said real tracking error signal to a digital value of said real tracking error signal during track seek operation control prior to fine position control of the head.

13. The system of claim 11 wherein said target tracking error generating means converts a polarity of said target tracking error signal at least every half cycle.

14. The system of claim 12 wherein said converting means converts a polarity of said real tracking error signal at least every half cycle.

* * * * *

UNITED STATES PATENT AND TRADEMARK OFFICE
CERTIFICATE OF CORRECTION

PATENT NO. : 5,195,067
DATED : March 16, 1993
INVENTOR(S) : Shigenori Yanagi

It is certified that error appears in the above-identified patent and that said Letters Patent is hereby corrected as shown below:

Column 14, line 49, delete "oontrol" and insert --control--.

Signed and Sealed this

Fifth Day of April, 1994

Attest:

BRUCE LEHMAN

*Attesting Officer*    Commissioner of Patents and Trademarks